United States Patent [19]

Nobutoki

[11] 4,405,938

[45] Sep. 20, 1983

[54] IMAGE PICKUP TUBE FACEPLATE STRUCTURE

[75] Inventor: Saburo Nobutoki, Mobara, Japan

[73] Assignee: Hitachi, Ltd., Tokyo, Japan

[21] Appl. No.: 265,810

[22] Filed: May 21, 1981

[30] Foreign Application Priority Data

Jun. 16, 1980 [JP] Japan .................................. 55-80203

[51] Int. Cl.[3] ................................................ H04N 9/04

[52] U.S. Cl. ......................................... 358/44; 358/55; 313/385; 313/386

[58] Field of Search ................... 358/55, 250, 253, 41, 358/44; 313/384, 364, 365, 386, 385

[56] References Cited

U.S. PATENT DOCUMENTS 3,928,160 12/1975 Nobutoki .......................... 358/44 X

*Primary Examiner*—Robert L. Richardson
*Attorney, Agent, or Firm*—Charles E. Pfund

[57] ABSTRACT

In the faceplate structure of image pickup tube having an organic coat, an inorganic transparent conductive film and an inorganic photoconductive film sequentially laminated on the central part of a transparent glass base, the inorganic transparent conductive film and the inorganic photoconductive film are formed so that they are non-porous in at least part of their respective sub-layers in the direction of lamination. Further, the transparent conductive film and the photoconductive film have a larger area than that of the organic coat so that they will completely cover the organic coat.

6 Claims, 3 Drawing Figures

IMAGE PICKUP TUBE FACEPLATE STRUCTURE

BACKGROUND OF THE INVENTION

This invention relates to improvements in the faceplate structure of the image pickup tube particularly of the type for use in a single pickup tube color television camera having a built-in color separation stripe-shaped filter (hereinafter simply referred to as "stripe filter").

Generally, in image pickup tubes for single pickup tube color television cameras capable of effecting color separation by means of a built-in stripe filter, the circuitry adopted therein is widely diverse, and in accordance therewith, the stripe filter and photoelectric signal take-out electrode in these image pickup tubes have various shapes and structures. Despite the difference in types of circuitry, the image pickup tubes of all types are always required to be constructed so that a stripe filter, a photoelectric conversion film and a transparent conductive film for take-out of photoelectric signal should be located optically in extremely close proximity to each other. In order that the optical proximity of the elements mentioned above may be realized in the faceplate, there have been heretofore adopted the structure in which the stripe filter is disposed on a fiber optic faceplate opposite to the photoelectric conversion film, the structure in which the stripe filter formed on one base and the photoelectric conversion film formed on the other base are joined to each other, and the structure in which the stripe filter is formed on a transparent base and, with a protective layer of an optically negligible thickness disposed thereon, the transparent conductive film and the photoelectric conversion film such as, for example, a photoelectric conductive film are overlaid thereon. The present invention aims to provide improvements in the faceplate of the last of the three structures mentioned above. The stripe filter comes in two types; the one type formed of an inorganic multilayer dichroic filter and the other type formed of an organic light selective filter. The improvements provided by this invention are meant for the image pickup tube using the stripe filter of the latter type.

Generally, in the organic filter, thin-film stripes such as of gelatin are formed on a glass base and dyed with an organic dyestuff. Since the edges of the thin-film stripes on the organic filter generally are not sharp, the next upper layer can be formed immediately on the filter. When necessary, however, there may be used a modified type in which the thin-film stripes are coated with an organic film intended as a protective film and the next upper layer is formed on the protective film. In the image pickup tube which uses such an organic filter as described above, since the surface of the photoelectric conversion film is generally required to be exposed to a high degree of vacuum and to be scanned with an electron beam, it is necessary that the base supporting the photoelectric conversion film should be of such material and structure as to provide fully reliable performance under such high degree of vacuum.

To meet this requirement, therefore, an intermediate protective layer of glass is interposed between the surface of the organic stripe filter (or the surface of the organic protective film in the case of the filter which is provided with this organic protective film) and the photoelectric conversion member (which consists of a transparent conductive film and a photoelectric conversion film such as, for example, a photoconductive film) by bonding a very thin glass sheet to the opposed surfaces or by applying a glass plate to the organic stripe filter surface, subsequently grinding and/or polishing the glass plate to a small thickness, so that the intermediate protective glass layer may prevent the gas emitted by the organic filter from leaking into the high degree of vacuum mentioned above.

As the transparent conductive film to be applied to the faceplate formed with the organic stripe filter, there is frequently used a cold formed transparent conductive film which can be formed on the intermediate protective glass layer, subsequently to the formation of this protective layer, at working temperature and time within an allowable heat resisting limit condition for the organic stripe filter. The coat which is composed preponderantly of $In_2O_3$ and formed by sputtering process is one typical example. If the transparent conductive film is prepared in the form of a non-porous film of from 500 to 5000Å thickness on the organic stripe filter without degrading the optical transmittivity required of this conductive film, this film suffers from the structural defects common to the non-porous film, i.e. heavy occurrence of pinholes in the direction of the film thickness. With this defective film, therefore, the gas emitted by the organic filter cannot be thoroughly prevented from leaking into the aforementioned high degree of vacuum. As the photoelectric conversion film, the film which is prepared by vacuum depositing such a principal constituent as $Sb_2S_3$, PbO or Se on the transparent conductive film is adopted in the image pickup tube of the photoconduction type. The material for this photoconductive film is widely variable with the kind of the film, and the method of vacuum deposition is also variable with the material to be adopted. Since mere lamination of the aforementioned transparent conductive film and photoelectric conversion film does not warrant preclusion of the gas leakage, the interposition of the intermediate protective glass layer described above has been found indispensable.

SUMMARY OF THE INVENTION

An object of this invention, therefore, is to provide a faceplate structure of the image pickup tube which is capable of preventing the gas emitted by the organic stripe filter from leaking into the high degree of vacuum without resort to the intermediate protective glass layer.

The object of this invention described above is accomplished by the faceplate structure of the image pickup tube formed by sequentially laminating an organic coat, an inorganic transparent conductive film and an inorganic photoconductive film on the central portion of a transparent glass base, which faceplate structure is characterized by the inorganic transparent conductive film and the inorganic photoconductive film being non-porous in at least part of their respective sub-layers in the direction of lamination and the transparent conductive film and the photoconductive film having areas greater than the area of the organic coat thereby being capable of completely covering the organic coat.

DESCRIPTION OF THE PREFERRED EMBODIMENT

Figure 2:
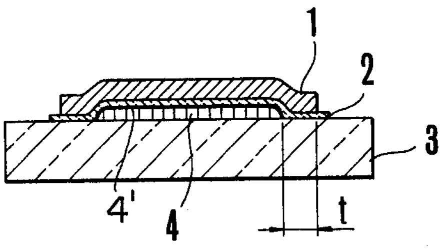
FIG. 2 is a sectional view of the faceplate structure taken along line II—II in FIG. 1.

The photoconductive film and the conductive film to be used in the faceplate of the image pickup tube are available in two types in a broad classification; the one type resulting from vacuum deposition under a high degree of vacuum (non-porous film) and the other type from vacuum deposition under a low degree of vacuum (porous film). These two types of film may be used separately or combined in a multi-layer. With reference to FIG. 2, the faceplate structure of the image pickup tube according to this invention has an organic coat 4 disposed on the central portion of a transparent glass base 3. This organic coat includes an organic stripe filter. A transparent conductive film 2 can be applied directly on the organic coat 4 because the thin-film stripes of the organic filter generally have no sharp edges as described above. To preclude breakage in the continuity of the transparent conductive film, it is essential that the cross-sectional shape of the organic coat should not contain any abrupt bend. When necessary, therefore, an organic protective coat 4' optionally may be provided on the organic stripe filter. A photoconductive film 1 is laminated on the transparent conductor film 2 formed on the organic coat 4.

Figure 3:
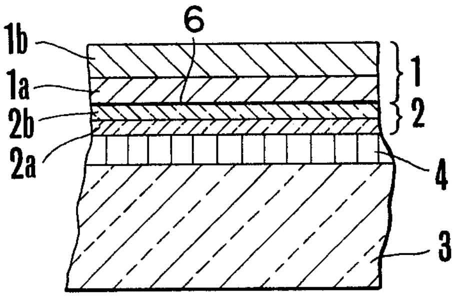
FIG. 3 is sectional view illustrating one example of a multi-layer structure of the transparent conductive film and the photoconductive film according to the present invention.

In one preferred embodiment of the invention, the transparent conductive film and the photoconductive film are each in a multi-layer construction containing non-porous sub-layers and porous sub-layers in the direction of lamination. In this case, at least the sub-layers of the respective transparent conductive film and the photoconductive film close to the organic coat are formed as non-porous sub-layers **2*a* and 1*a* as illustrated in FIG. 3. The sum of the thickness of the non-porous sub-layers 2*a* and 1*a*** is desired to exceed 3 microns from the standpoint of warranting the preclusion of gas leakage and preferably not larger than 8 microns from the standpoint of photoelectro conversion characteristics.

Figure 1:
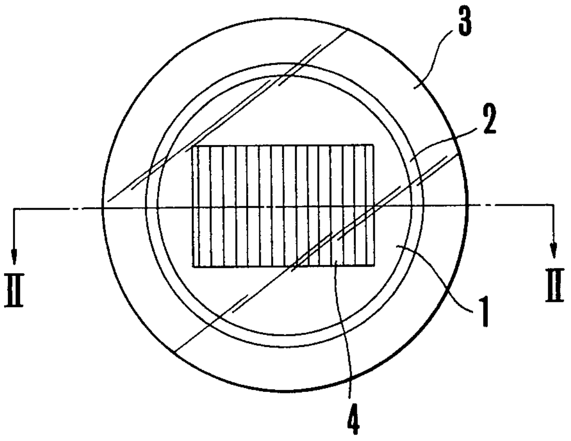
FIG. 1 is a plan view of a faceplate structure of image pickup tube embodying this invention.

As is evident from FIG. 1 and FIG. 2, the transparent conductive film 2 and the photoconductive film 1 of the present invention are formed so that they will completely cover the organic coat 4. By the structure described above, an ample service life can be given with high reliability to the faceplate structure exposed to the interior of the vacuum tube without requiring interposition of the conventional intermediate protective glass layer.

During the formation of the transparent conductive film and the photoconductive film, it is desirable that these films are not affected by temperatures exceeding a maximum of about 100° C. Where the maximum temperature of treatment is high, it is often effective for obtaining high quality coat that the organic stripe filter which has been formed first on the glass base 3 is dried in advance by heating in a vacuum at a temperature exceeding the maximum temperature of treatment. As the transparent conductive film, the film obtained by vacuum depositing a material composed solely or preponderantly of $In_2O_3$ in a high degree of vacuum, or the coat obtained by sputtering a material composed solely or preponderantly of $In_2O_3$ in the atmosphere of an inert gas such as Ar or a mixture of such inert gas with oxygen and in some cases with oxygen and water vapor may be used similarly to the photoconductive film. This transparent conductive film, aided by the shielding effect of the non-porous photoconductive film to be formed subsequently, serves to prevent the gas emitted by the organic coat from leaking into the high degree of vacuum.

To ensure the photoconductive property expected, a porous sub-layer **1*b* is required to be formed within the photoconductive layer in addition to the non-porous sub-layers 2*a*, 1*a* of the 3 or more micron total thickness formed respectively in the transparent conductive film and the photoconductive film. Even when this porous sub-layer is additionally formed, the gas leakage to the high degree of vacuum can be prevented. In contrast, a porous sub-layer 2*b*** as illustrated to be formed within the transparent conductive film may be omitted, if desired.

It is sometime impossible to form the transparent conductive film and the photoconductive film so as to cover completely the surface of the faceplate by reason of the structure of the vacuum tube. In such a case, the photoconductive film 1 is formed with an outer diameter smaller than the outer diameter of the transparent conductive film 2 and, generally, the transparent conductive film 2 is not formed to cover completely the surface of the glass base 3 as illustrated in FIG. 1 and FIG. 2. In this respect, it becomes necessary to form the organic coat 4 in an area smaller than the areas of the two films 1, 2. For the possible peripheral peeling-off of the transparent conductive film and the photoconductive film of thickness of several microns to be totally negligible, the organic coat 4 is desired to be formed completely within the area of the photoconductive film 1 so that the distance t indicated in FIG. 2 measures at least 0.5 mm. When the organic coat 4 is larger than this size, the edge of the mask jig to be used during the formation of the photoconductive film 4 (wherein the thickness of the photoconductive film being formed within the opening of the mask gradually decreases toward the inner edge of the mask) has an influence such that the produced film fails to acquire a thickness sufficient to manifest its expected ability to preclude the gas leakage.

As described above, this invention has an outstanding effect of providing an image pickup tube which is provided with an organic stripe filter exposed to high vacuum interior, without necessitating interposition of any intermediate protective glass layer.

Although the foregoing preferred embodiment has been described as representing the type of the faceplate structure of image pickup tube wherein the photoconductive film is formed subsequently to the transparent conductive film, this invention can manifest the same effect when it is applied to other types of the faceplate structure of image pickup tube such as, for example, the type in which a non-conductive, non-photoconductive inorganic transparent film 6 formed of an inorganic material such as $SiO_2$ or $CeO_2$ is optionally interposed between the transparent conductive film 2 and the photoconductive film 1 to curb dark current and reinforce junctions.

What is claimed is:

1. In an image pickup tube having a color separation filter mainly comprising organic materials, an inorganic transparent conductive film and an inorganic photoconductive film sequentially laminated in the order named on the central part of a transparent glass faceplate, the improvement wherein the inorganic transparent conductive film and the inorganic photoconductive film are non-porous and the transparent conductive film and the photoconductive film have areas greater than the area of the color separation filter to completely cover the color separation filter for isolating said organic materials from the inner vacuum of said tube.

2. The faceplate structure according to claim 1, wherein sublayers of the transparent conductive film and the photoconductive film and the photoconductive film close to the color separation filter are non-porous and the combined thickness of the nonporous layers in the two films is 3 microns or more.

3. The faceplate structure according to claim 2 wherein the photoconductive film has a porous layer on the non-porous layer.

4. The faceplate structure according to claim 1 wherein the color separation filter is formed of a color separation stripe-shaped filter and a protective layer thereon.

5. The faceplate structure according to claim 1 wherein the areas of the photoconductive film and the transparent conductive film are in excess of the area of the color separation filter by 0.5 mm or more.

6. The faceplate structure according to any of the foregoing claims, wherein an inorganic non-conductive, non-photoconductive transparent film is located between the inorganic transparent conductive film and the inorganic photoconductive film.

* * * * *